Patented Apr. 1, 1930

1,752,863

UNITED STATES PATENT OFFICE

OMAR F. TARR, OF BALTIMORE, MARYLAND, ASSIGNOR TO MUTUAL CHEMICAL COMPANY OF AMERICA, OF NEW YORK, N. Y., A CORPORATION OF NEW JERSEY

MANUFACTURE OF CHROMATES

No Drawing.   Application filed April 3, 1929.   Serial No. 352,322.

This invention relates to the manufacture of chromates, and provides an improved process of manufacturing alkali chromates from chromium ores or other suitable chromium bearing materials.

In the usual method of making alkali chromates, a mixture of approximately equal parts by weight of finely pulverized chromium ore and of a basic refractory material such as burned lime, together with approximately the theoretical amount of alkali carbonate, usually soda ash, required to combine with all or nearly all of the chromium in the mixture, is roasted or calcined at a temperature around 1000° C. The mixture after roasting is cooled and then leached and washed to recover soluble alkali chromates. The residue after leaching is either discarded or a portion dried and used to replace some of the basic refractory material in the original mixture.

The manufacture of chromates, as above described, is carried out as a single furnace operation. The large amount of lime employed is necessary to prevent objectionable fusion of the mixture, and a very considerable amount of the chromium is usually left in the leached material, with corresponding reduction in the amount of alkali chromate recovered.

The present invention provides an improved process in which a greatly reduced amount of basic refractory material is employed, in which an increased recovery of alkali chromates is obtained, and which has other advantages, such as those hereinafter set forth.

According to the present invention, a furnace mixture is employed in which the amount of basic refractory material is greatly reduced, as compared with the usual amount, and in which much less than the theoretical requirement of alkali carbonate is employed, and the process is carried out as a multi-stage process with addition of alkali carbonate in the successive stages.

Chromium ores contain varying amounts of silica and alumina, and I employ sufficient basic refractory material, such as lime, so that silica and alumina are not present to any objectional amount in the leach liquor containing the alkali chromates, particularly in the second or subsequent stages of the process where more soda ash is added. An increased amount of lime is unnecessary and in general should not be used, since such increase not only increases the cost of the lime employed but also increases the bulk of materials to be handled in the furnacing, drying, grinding and other operations. In general, I have found an amount of lime equal to around one-half the weight of the chromium ore satisfactory, but this amount can be somewhat increased, particularly where there is danger of fusion of the charge with a decreased amount.

The alkali carbonate, usualy soda ash, is added in the successive stages of the process, so that, in any one stage except the last, the proportion of soda ash is only a fraction of that theoretically required. In a two-stage operation, the proportion of soda ash employed in the first stage may advantageously be somewhat more than one-half the theoretical amount required to combine with all the chromium in the charge, so that, for example, around 50%, more or less, of the chromium will be recovered at the end of the first furnacing operation, as alkali chromates. In the second furnacing operation, the amount of soda ash added may be that theoretically required to combine with the remaining chromium in the mixture, but this amount can be somewhat varied.

When the process is carried out as a three-stage process, the amount of lime employed can be somewhat reduced, so long as it is sufficient to take care of the silica and alumina and limit their appearance in the chromate solution leached from the furnace product. If no lime is employed, or if insufficient lime is employed, sodium silicate and sodium aluminate will be formed, and, on leaching the sodium chromate, the solution obtained will contain silicate and aluminate, and will contain caustic alkali resulting from their decomposition. Such solutions may require special treatment to purify them from silica and alumina, while the alkali which is combined with the silica and alumina, is lost to the process so far as the formation of chromate is concerned. However, when sufficient lime is present in the furnace charge, the formation of sodium silicate and sodium aluminate is substantially prevented.

The invention will be further illustrated by the following more detailed description, by way of specific example, but it will be understood that the invention is not limited thereto.

A furnace charge is prepared in the form of an intimate mixture of ingredients, in the proportions indicated (the parts are by weight):

100 parts of chrome ore (50% $Cr_2O_3$)
50 parts burned lime
40 parts soda ash (58% $Na_2O$)

This mixture is roasted in a suitable furnace, such as is commonly employed in producing chromates, at a suitable temperature, around 1000° C., in an oxidizing atmosphere, and the furnace product, after cooling, is leached to recover sodium chromate which is somewhat less in amount than the equivalent of the sodium carbonate used. The residue after leaching contains approximately one-half the original quantity of insoluble chromium compounds. This residue is dried, for example, in a suitable rotary kiln, and is then pulverized and mixed with another portion of soda ash, usually nearly the theoretical amount required to combine with all the remaining chromium present. The resulting mixture is subjected to a second furnacing operation and roasted in an oxidizing atmosphere. After cooling the sodium chromate is recovered by leaching. The amount of insoluble chromium compounds remaining in the leached residue will usually be too low for economical further treatment, in which case the residue is either discarded or a portion used to replace some of the lime in the first mixture.

In the process of the above example, the proportions may be varied somewhat, but it is important that the weight of soda ash be kept sufficiently low, and the amount of lime sufficiently high, so that the mixture does not tend to become pastry in roasting, and that the ratio of lime be not reduced to such a degree that objectionable quantities of the soluble compounds of alumina and silica appear in the leach liquors from the first or succeeding roasting operations.

The ore component of the residue from the first roasting and leaching operation will be decreased in weight, by the amount of chromic oxide removed therefrom, which may represent, for example, around one-half of the total chromium content of the ore. This residue will also contain an increased proportion of lime (in a free or combined condition), as compared with the original charge, owing to the removal of part of the chromium from the charge. The residue may be dried only to an amount which will remove free water, or it may be heated to a higher temperature to remove any combined water present. The further addition of soda ash can be made either prior to the drying and grinding or subsequent thereto, or the drying operation may be omitted altogether.

The furnace in which the roasting operations are carried out may be hand rabbled furnaces or mechanically operated furnaces can be employed.

The time required for the furnacing operations will vary somewhat with the charge, with the type of furnace, and with the operating conditions.

In preparing the initial furnace charge, instead of using lime alone as the basic refractory material, some of the dried residue from the first furnacing and leaching operation may be used to replace a portion of the lime, or some of the residue from the second or final furnacing and leaching operation may be so employed.

In the process of the above example, objectionable fusion is avoided. The product from the first furnacing operation is usually of a sandy or gravelly character such that it can readily be handled and leached. The product from the second furnacing operation may be more in the nature of a dense coky aggregate somewhat sintered, but it can also be readily handled and leached.

It will thus be seen that the present invention provides an improved process in which the objections to the present methods of producing chromates are largely overcome or minimized, and in which various added advantages are obtained. It will be seen that the amounts of basic refractory material employed is radically reduced as compared with present practice, but that the amount is nevertheless sufficient to prevent objectionable quantities of soluble alumina and silica compounds from appearing in the leach liquors. The amount of soda ash employed in each stage of the process is kept below that which will cause the furnace mixture to become pasty during roasting, and, in the successive furnace operations, only a fraction of the total theoretically required portion of soda ash is employed. The process can thus be carried out as a multi-stage process with the avoidance of a large excess of lime, with the avoidance of objectionable fusion of the furnace product, and with increased recovery of chromates and corresponding reduction in loss of chromium in the final residue.

I claim:

1. The process of manufacturing alkali chromates which comprises roasting in an oxidizing atmosphere a mixture of finely pulverized chromium ore with about half its weight of pulverized basic refractory material and an amount of alkali carbonate sufficient to combine with a part only of the chromium content of the ore, leaching the roasted product, mixing the residue with a further quantity of alkali carbonate and subjecting the resulting mixture to a further roasting operation with subsequent leaching of the roasted product to recover alkali chromate therefrom.

2. The process according to claim 1 in which a portion of the residue from the first leaching operation is used as part of the basic refractory material in the first furnace mixture.

3. The process according to claim 1 in which a portion of the residue from the final leaching operation is used as part of the basic refractory material in the first furnace mixture.

4. The process of manufacturing alkali chromates which comprises subjecting a mixture of chromium ore with about half its weight of basic refractory material but in excess with relation to the alkali carbonate employed to a succession of roasting treatments with the addition before each roasting treatment except the last of an amount of alkali carbonate less than the theoretical requirement, and with leaching of the roasted product after each roasting operation.

5. A process of manufacturing alkali chromates which comprises admixing with chrome ore an amount of lime sufficiently in excess with regard to alkali carbonate employed to prevent any objectionable amount of alkali silicate and aluminate in the alkali chromate solution produced, adding an amount of alkali carbonate sufficient to combine with a part only of the chromium content of the ore, subjecting the mixture to roasting under oxidizing conditions, leaching the roasted product to recover alkali chromate, adding a further amount of alkali carbonate to the residue and subjecting the same to a further roasting and subsequent extracting treatment to recover additional alkali chromate.

6. The process of manufacturing alkali chromate which comprises subjecting a mixture of finely divided chromium ore and basic refractory material to a series of roasting treatments under oxidizing conditions with addition of alkali carbonate before each roasting operation and extraction of alkali chromate after each roasting operation, the amount of alkali carbonate added in each stage except the last being a fraction of that theoretically required, the amount of basic refractory material being sufficient to prevent any objectionable amount of alkali silicate and aluminate in the alkali chromate solutions and sufficient under the operating conditions to prevent fusion of the mixture.

7. The method of producing sodium chromate which comprises mixing finely divided chromium ore with about half its weight of finely divided lime and with an amount of sodium carbonate representing somewhat more than half the theoretical amount required to combine with the chromium content of the ore but which does not exceed the weight of the lime, subjecting the mixture to a roasting operation under oxidizing conditions, leaching sodium chromate from the roasted product, adding additional sodium carbonate to the residue and subjecting the resulting mixture to a further roasting and subsequent leaching operation to recover sodium chromate therefrom.

In testimony whereof I affix my signature.

OMAR F. TARR.